(12) United States Patent
Eckel et al.

(10) Patent No.: US 9,780,658 B2
(45) Date of Patent: Oct. 3, 2017

(54) INTERMEDIATE VOLTAGE CIRCUIT CURRENT CONVERTER IN FIVE-POINT TOPOLOGY

(71) Applicant: Siemens Aktiengesellschaft, München (DE)

(72) Inventors: Hans-Günter Eckel, Rostock (DE); Sidney Gierschner, Rostock (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 23 days.

(21) Appl. No.: 14/869,327

(22) Filed: Sep. 29, 2015

(65) Prior Publication Data

US 2016/0094128 A1    Mar. 31, 2016

(30) Foreign Application Priority Data

Sep. 30, 2014   (EP) .................................. 14187014

(51) Int. Cl.
| | |
|---|---|
| *H02M 3/335* | (2006.01) |
| *H02M 3/158* | (2006.01) |
| *H02M 7/487* | (2007.01) |
| *H02M 1/00* | (2006.01) |

(52) U.S. Cl.
CPC ........... *H02M 3/158* (2013.01); *H02M 7/487* (2013.01); *H02M 2001/007* (2013.01)

(58) Field of Classification Search
CPC ................. H02M 3/158; H02M 7/487; H02M 2001/007; H02M 7/217
USPC .......... 363/16–20, 25, 53, 56.01, 65, 71, 97, 363/132, 131
See application file for complete search history.

(56) References Cited

U.S. PATENT DOCUMENTS

| | | | |
|---|---|---|---|
| 4,429,357 A * | 1/1984 | Hausler ............... | H02M 7/7575 363/35 |
| 7,480,160 B2 | 1/2009 | Bakran et al. | |
| 7,577,008 B2 * | 8/2009 | Hiller .................... | H02M 7/217 363/132 |

(Continued)

FOREIGN PATENT DOCUMENTS

| | | |
|---|---|---|
| DE | 10 2012 214 663 A1 | 2/2014 |
| JP | 2014064431 A | 4/2014 |
| WO | WO 2015-174024 A1 | 11/2015 |

*Primary Examiner* — Rajnikant Patel
(74) *Attorney, Agent, or Firm* — Henry M. Feiereisen LLC

(57) ABSTRACT

An intermediate voltage circuit current converter having two current converter sections arranged in series on the direct voltage side is disclosed. The current converter section has a capacitor connected in parallel with two bridge modules that are connected in series with each other. The output of the current converter section is located on the series connection between the two bridge modules and the outputs of the two current converter sections are connected to a further bridge module. Each bridge modules comprises a series connection of two power semiconductor units. The intermediate potentials on the connection between the two power semiconductor units in each of the bridge modules are electrically connected to one another by a further capacitor, and the intermediate potential of the further bridge module provides the phase connection of the intermediate voltage circuit current converter for a given phase of the intermediate voltage circuit current converter.

9 Claims, 1 Drawing Sheet

(56) References Cited

U.S. PATENT DOCUMENTS

Figure 1:
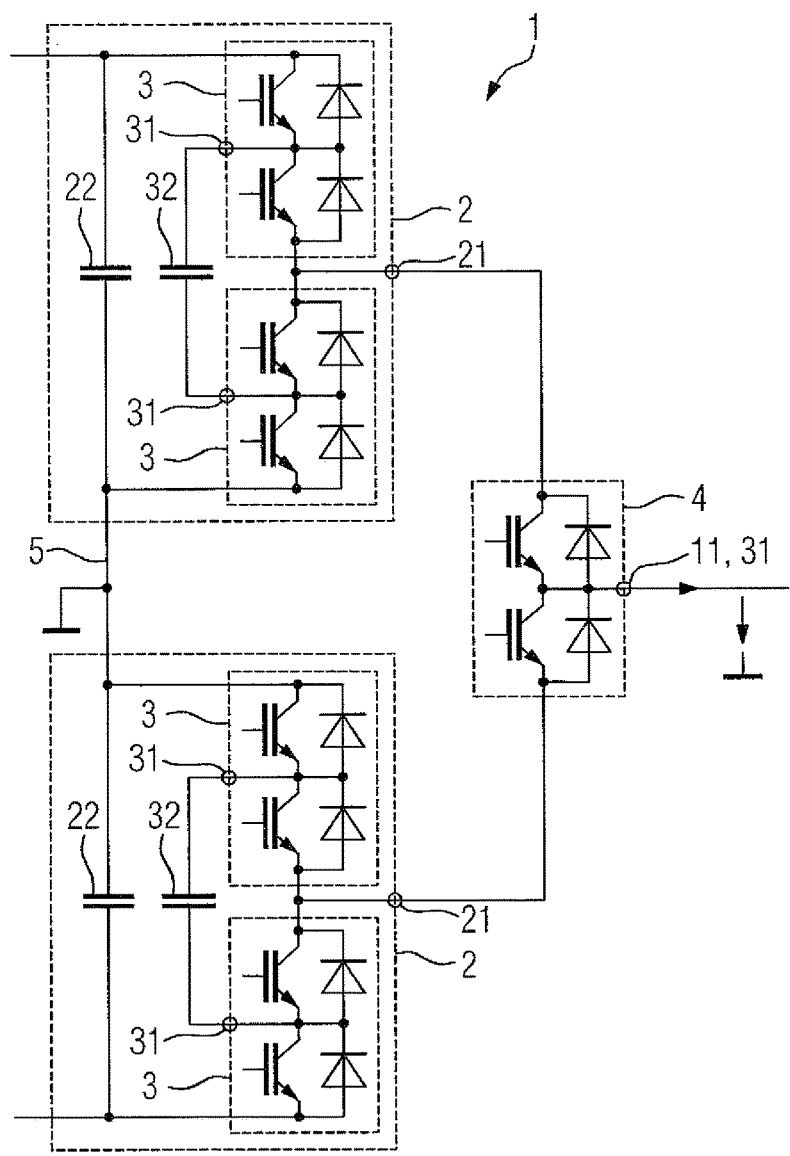

| | | |
|---|---|---|
| 7,582,939 B2 | 9/2009 | Bakran et al. |
| 8,649,187 B2 * | 2/2014 | Aiello .................. H02M 7/483 |
| | | 363/131 |
| 8,854,109 B2 | 10/2014 | Eckel |
| 9,083,230 B2 * | 7/2015 | Narimani ................ H02M 3/07 |
| 9,136,695 B2 * | 9/2015 | Takizawa ............. H02H 7/1203 |
| 9,318,974 B2 * | 4/2016 | Yoscovich ............ H02M 7/537 |
| 9,479,080 B2 * | 10/2016 | Yatsu .................... H02M 7/483 |
| 2008/0060542 A1 | 3/2008 | Bakran et al. |
| 2012/0092912 A1 | 4/2012 | Eckel |
| 2012/0218795 A1 | 8/2012 | Mihalache |
| 2013/0314957 A1 | 11/2013 | Gupta |
| 2014/0063885 A1 | 3/2014 | Itoh |

\* cited by examiner

INTERMEDIATE VOLTAGE CIRCUIT CURRENT CONVERTER IN FIVE-POINT TOPOLOGY

CROSS-REFERENCES TO RELATED APPLICATIONS

This application claims the priority of European Patent Application, Serial No. EP 14192066.0, filed Nov. 6, 2014, pursuant to 35 U.S.C. 119(a)-(d), the content of which is incorporated herein by reference in its entirety as if fully set forth herein.

BACKGROUND OF THE INVENTION

The invention relates to a circuit current converter. More particularly, the invention relates to an intermediate voltage circuit current converter.

Current converters are used to convert electrical power with respect to voltage level, current level, frequency and phase angle. Current converters for the conversion of alternating voltage into direct voltage or from alternating current into direct current are referred to as rectifiers. In contrast, current converters for the conversion of direct voltage into alternating voltage or from direct current into alternating current are referred to as inverters. Current converters for the conversion of power, with voltages/currents, from one frequency into another frequency are referred to as frequency converters.

Current converters are specifically used to supply electrical energy to electrical machines and engines. As a result these electrical machines and engines can be controlled and regulated by the current converter. A further field of application is the control of energy flows, the compensation of harmonic waves and the provision of reactive power in power supply networks. Moreover current converters are involved in the low-loss transmission of energy by means of high voltage direct current (HVDC) transmission.

In order to reduce the harmonic components in the voltage and current on the AC side of the current converter, current converters with a higher number of phases are used. Compared with 2-point current converters, the output voltage of these current converters has a lower harmonic factor and allows for a higher intermediate voltage circuit and thus a higher output voltage on the alternating voltage side, with the same cut-off voltage. Three-point current converters therefore already have a wide field of application in different embodiments. Five-point current converters can achieve an even better output voltage quality.

Five-point current converters that are already known use very complex commutation circuits. The individual potentials, at least a large part of the individual potentials, must be connected to the power semiconductors in a low-inductance manner. This results in restrictions, due to the use of low-inductance bus bars or the spatial proximity of the individual components, for instance.

SUMMARY OF THE INVENTION

The present invention provides an intermediate voltage circuit current converter, in which individual connections no longer have to be low-inductance connections.

In accordance with the invention, an intermediate voltage circuit current converter having two current converter sections arranged in series on the direct voltage side. The current converter section has a parallel connection of a capacitor with a series connection comprising two bridge modules. The connection between the two bridge modules arranged in a series connection is an output of the current converter section. The outputs of the two current converter sections are connected to one another by means of a further bridge module. The bridge modules each comprise a series connection of two power semiconductor units and the intermediate potentials of the bridge modules represent the connection between the two power semiconductor units. The intermediate potentials of the current converter section are electrically connected to one another by way of a further capacitor, and the intermediate potential of the further bridge module represents a phase connection of the intermediate voltage circuit current converter.

One of the advantages of the invention is that the commutation circuits of the individual power semiconductors can be simplified. As a result, low-inductance connections are no longer required for some of the connections. Other electrical connections, such as cables that are significantly more cost-effective, can then also be used Instead of bus bars, for instance. In particular, with the inventive intermediate-voltage circuit current converter, low-inductance connections between the two conductor sections are no longer needed. The same applies to the connection between current converter sections and a further bridge module. The intermediate voltage circuit current converter can then have a modular structure, wherein a low-inductance connection is provided within these modules and the modules are connected to one another with higher inductance connections. Cables are thus also suited to be the connections between the individual modules, In particular.

In accordance with a particular embodiment of the invention, an intermediate voltage circuit current converter can transmit energy from the direct voltage side to the phase connection and vice versa. Thus, the phase connection, also referred to as a load connection, is the connection point of an electrical load or a phase of a power supply network. The intermediate voltage circuit current converter may be single-phase or multi-phase, in particular a three-phase converter for connection with a three-phase network or a three-phase current load.

In another embodiment, a multi-phase arrangement, each phase has a circuit in accordance with the invention and the circuits are connected in a parallel on the direct voltage side. Thus, it is possible to dispense with additional capacitors in the current converter sections, which are arranged in parallel relative to the series connection of the bridge modules. Moreover, the existing capacitors that are arranged in parallel with the series connection of bridge modules often have a lower capacitance than comparable single-phase current converters, since the voltage ripples of the intermediate circuit are reduced because the power output is continuous.

In an advantageous embodiment, the connection between the current converter section and the further bridge module has a higher inductance than the connections with the capacitor, or the further capacitor, and the power semiconductor unit. When the current converter no longer requires a low-inductance connection for commutation processes, because of its structure, this can be used to dispense with some low-inductance design requirements, a low-inductance bus bar, for instance. Significantly more cost-effective alternatives can then be used for these connections, like cable connections for instance.

In a further advantageous embodiment, the electrical connection between the current converter sections has a higher inductance than the connections between capacitors or between the further capacitor and power semiconductor unit. The possibility of the current converter, on account of its structure, no longer requiring a low-inductance connection for commutation processes at some points can be used to dispense with the low-inductance design, a low-inductance bus bar for instance. Significantly more cost-effective alternatives can be used for these connections, like cable connections for instance.

In a further advantageous embodiment, the current converter sections are spatially separated from one another in different switching cabinets. Aside from a cost-effective connection, the possibility of omitting a low inductance connection also offers the possibility of spatially separating the individual modules, such as current converter sections and the bridge module, from one another. Particularly in applications in which the installation space is significantly restricted, as in a vehicle for instance, the individual current converter components can be spatially separated from one another and the distance between them easily and cost-effectively bridged using cables.

In a further advantageous embodiment, the current converter components are arranged in different switch cabinets. These components can be accommodated in a modular manner in current converter cabinets on account of the low inductive connection, which is no longer needed, between the current converter sections and between the current converter section and the bridge module. As a result, significantly smaller cabinets can be used, which have significantly lower demands in terms of installation space or floor space. The demands on installation space/floor space are thus reduced. The smaller cabinets' lower weight has also proven to be advantageous for transportation of the cabinets.

In a further advantageous embodiment, the power semiconductor unit is a disconnectable power semiconductor switch with a diode arranged anti-parallel thereto, i.e. arranged in parallel, but with a reversed polarity. This circuit is designed to use standard components that can be obtained easily and cost-effectively, and which ensure reliable operation of the intermediate voltage circuit current converter.

In a further advantageous embodiment, the power semiconductor unit comprises a series connection between a number of power semiconductors, and a higher cut-off voltage in the power semiconductor unit can thus be achieved. This is particularly advantageous in the case of the power semiconductor units in the further bridge module.

In general, depending on the working point of the power semiconductor units in the further bridge module, a higher voltage prevails there than in the power semiconductor units of the current-converter section. Therefore, on account of a series connection of power semiconductors and the resulting higher cut-off voltage associated therewith, optimal utilization of the power semiconductors of the intermediate voltage circuit current converter can be achieved. The series connection of a number of power semiconductors, in the further bridge module in particular, thus guarantees optimal utilization of the power semiconductors.

In a further advantageous embodiment, the voltage range in which the intermediate voltage circuit current converter can be used can be further increased in size. The individual modules can be larger and heavier because of their modular structure. Thus these individual modules can also be managed more easily than the conventional five-point current converters that are all installed in a switching cabinet, particularly in respect of the size and weight of the individually-installed modules. Large and powerful current converters then can be assembled from these individual modules, such as current converter sections and a further bridge module, in a simple and cost-effective manner.

In a further advantageous embodiment, the power semiconductor unit comprises disconnectable IGBT and/or IGCT-type power semiconductors. These standard power electronic components are available cheaply and are reliable when used in the intermediate voltage circuit current converter. Their switching behavior allows parts of the intermediate voltage circuit current converter to dispense with low-inductance connections.

In a further advantageous embodiment, the power semiconductor unit comprises a reverse-conductive, disconnectable power semiconductor. The semiconductor material used can be utilized particularly effectively in this type of power semiconductor. This provides a cost-effective intermediate voltage circuit current converter.

In a further advantageous embodiment, the current-converter section and/or the further bridge module is a replaceable unit. This construction of the circuit ensures easy replacement of these components. For instance, these are advantageously assembled in a current converter cabinet such that they can be easily removed therefrom in a simple manner, using a few hand movements. Moreover, if care is taken in the selection of the components, the invention can ensure that the weight of the individual replaceable units is not greater than can be raised and held by one or two people without additional tools. In practice, weights in the range of 15 kg to 50 kg, a weight of approx. 30 kg in particular, have proven to be advantageous. On account of the modular construction that provides individual modules such as the current converter section or bridge module, these weights are only possible for a current converter in the corresponding rating class in accordance with the present invention.

BRIEF DESCRIPTION OF THE INVENTION

Figure 2:
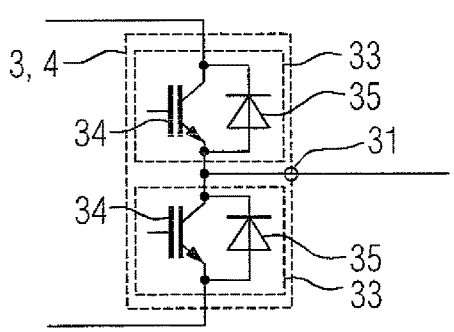

Other features and advantages of the present invention will be more readily apparent upon reading the following description of currently preferred exemplified embodiments of the invention with reference to the accompanying drawing, in which:

FIG. 1 shows an intermediate voltage circuit current converter in accordance with the invention; and FIG. 2 shows a bridge module in accordance with another embodiment of the invention.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, FIG. 1 shows one presently preferred embodiment of an intermediate voltage circuit current converter 1 having two current converter sections 2. These two current converter sections 2 are connected in series with each other on the direct voltage side. This series connection represents the intermediate circuit of the intermediate voltage circuit current converter 1. Each current converter section 2 comprises a capacitor 22, and with a series connection between two bridge modules 3 that are electrically connected in parallel with that series circuit. The central connection point of this series circuit is the output 21 of the current converter section 2. The outputs 21 of the two current converter sections 2 are electrically connected to a further bridge module 4. The individual bridge modules 3, 4, i.e. the bridge modules 3 that are arranged in the current converter section 2, as well as the further bridge module 4, have an intermediate potential 31. The intermediate potential 31 is also provided by the circuit discussed in relation to FIG. 2.

The two intermediate potentials 31 of the current converter section 2 are connected to one another by way of a further capacitor 32. In contrast, the intermediate potential 31 of the further bridge module 4 is the phase connection 11 of the intermediate voltage circuit current converter 1.

The intermediate voltage circuit current converter 1 shown in FIG. 1 is a single phase embodiment. This current converter therefore only has one phase connection 11. A multi-phase intermediate voltage circuit current converter (not shown) can be constructed by adding further phases connected in parallel to the circuit shown in FIG. 1. Three-phase embodiments in particular have proven advantageous for three-phase applications.

In a multi-phase embodiment it is possible to dispense with adding capacitors 22 of the current converter section 2 in parallel with the series connection of the two bridge modules 3. In the three-phase case, in particular, the capacitors 22 arranged in parallel with the series connection of the two bridge modules 3 in the current converter section 2, can be embodied with lower capacitance, since the uniform instantaneous output to the phase connections 11 results in a lower ripple in the intermediate voltage circuit.

With the single-phase embodiment, it has proven advantageous to define the potential of the intermediate circuit clearly by means of grounding. To this end grounding is provided in the exemplary embodiment according to FIG. 2 in the connection 5 between the two current converter sections 2. Grounding can alternatively be provided at any other point in the intermediate voltage circuit current converter 1, in particular on one of its current converter sections 2. Depending on the field of application, in particular with multi-phase or three-phase embodiments of the invention, it is possible to dispense with the grounding the intermediate circuit.

In this exemplary embodiment, the connection 5 between the two converter sections 2 and the connections between the current converter section 2 and the further bridge module 4 must not be low inductance connections on account of the commutation processes in the power semiconductors.

FIG. 2 shows an exemplary embodiment of a bridge module 3, 4. This has a series connection of two power semiconductor units 33. The connecting point of the two power semiconductor units 33 provides the intermediate potential 31. In this exemplary embodiment, each power semiconductor unit 33 includes a parallel connection of a disconnectable power semiconductor 34, preferably an IGBT or IGCT component, and a diode 35 that is arranged anti-parallel thereto. Alternatively, it has proven advantageous to replace this parallel connection with a reverse conductive, disconnectable power semiconductor. Furthermore, providing a series connection of several power semiconductors for the power semiconductor unit 33 has proven to be advantageous in that a higher breakdown voltage is produced as a result, so that the intermediate voltage circuit current converter 1 can be configured for operation at higher voltages. The series connection of power semiconductors in the power semiconductor unit 33 has proven particularly advantageous for the further bridge module 4, for optimally utilizing the power semiconductor of the intermediate voltage circuit current converter 1, in that the voltage applied to the power semiconductor units 33 of the further bridge module 4 in the disconnected state is higher than that applied to the power semiconductor units 33 of the current converter section 2.

The phase connection 11 of the intermediate voltage circuit current converter 1 corresponds to the intermediate potential 31 of the further bridge module 4.

Although the invention has been illustrated and described in detail with reference to presently preferred embodiments, it will be apparent to one skilled in the art that variations and modifications thereof are possible without departing from the spirit and scope of this invention. The invention is defined by the appended claims.

What is claimed is:

1. Intermediate voltage circuit current converter apparatus comprising:
    two current converter sections connected in series with each other on the direct voltage side of the apparatus;
    two bridge modules in each current converter section, each bridge module having at least two power semiconductor units connected in series with each other;
    a respective intermediate potential output connection point located on the series connection between the two power semiconductor units in each bridge module;
    a capacitor in each current converter section, said capacitor being connected in parallel with the two bridge modules that are connected in series with each other in each current converter section;
    a respective intermediate potential output connection point located on the series connection between the two bridge modules in each current converter section;
    a further capacitor electrically connecting the intermediate potential outputs of the two bridge modules in each current converter section;
    a further bridge module connecting the output connection points of the two current converter sections to one another; and
    a phase output connection point of the intermediate voltage circuit current converter located on the series connection between the two power semiconductor units in the further bridge module,
    wherein the power semiconductors of the power semiconductor unit are disconnectable power semiconductors of the IGBT and/or IGCT type.

2. The intermediate voltage circuit current converter of claim 1, wherein the connections between the current converter sections and the further bridge module have a higher inductance than the inductance of the connections between the capacitor or the further capacitor and the power semiconductor unit.

3. The intermediate voltage circuit current converter of claim 1, wherein the electrical connection between the current converter sections has a higher inductance than the connections between the capacitor or the further capacitor and the power semiconductor unit.

4. The intermediate voltage circuit current converter of claim 1 wherein the current converter sections are arranged spatially separated from one another.

5. The intermediate voltage circuit current converter of claim 1, wherein the current converter sections are arranged in different switching cabinets.

6. The intermediate voltage circuit current converter of claim 1, wherein the power semiconductor unit has a disconnectable power semiconductor switch with a diode connected anti-parallel thereto.

7. The intermediate voltage circuit current converter of claim 1, wherein more than two power semiconductors are connected in series in the power semiconductor unit.

8. The intermediate voltage circuit current converter of claim 1, wherein the power semiconductor unit has a reverse conductive, disconnectable power semiconductor.

9. The intermediate voltage circuit current converter of claim 1, wherein the current converter section and/or the further bridge module is a replaceable unit.

* * * * *